United States Patent
Aminaka et al.

[11] Patent Number: 6,081,312
[45] Date of Patent: Jun. 27, 2000

[54] HOMEOTROPIC LIQUID CRYSTAL CELL WITH ONE OR MORE COMPENSATOR PLATES WITH A SMALL BIREFRINGENCE

[75] Inventors: Eiichiro Aminaka; Yosuke Nishiura; Ichiro Amimori, all of Kanagawa, Japan

[73] Assignee: Fuji Photo Film Co., Ltd., Minami-ashigara, Japan

[21] Appl. No.: 09/037,534

[22] Filed: Mar. 10, 1998

[30] Foreign Application Priority Data

Mar. 10, 1997 [JP] Japan ................................ 9-055316

[51] Int. Cl.[7] .................................................. G02F 1/1335
[52] U.S. Cl. .......................... 349/118; 349/117; 349/119; 349/120
[58] Field of Search ..................... 349/117, 118, 349/119, 120, 121

[56] References Cited

U.S. PATENT DOCUMENTS

| | | | |
|---|---|---|---|
| 5,568,290 | 10/1996 | Nakamura | 349/117 |
| 5,583,679 | 12/1996 | Ito et al. | 349/120 |
| 5,646,703 | 7/1997 | Kamada et al. | 349/118 |
| 5,706,068 | 1/1998 | Abileah et al. | 349/120 |
| 5,718,838 | 2/1998 | Okazaki | 349/73 |
| 5,796,378 | 8/1998 | Yoshida et al. | 349/118 |
| 5,805,253 | 9/1998 | Mori et al. | 349/118 |
| 5,818,559 | 10/1998 | Yoshida | 349/119 |
| 5,818,615 | 10/1998 | Abileah et al. | 349/117 |

*Primary Examiner*—William L. Sikes
*Assistant Examiner*—Heidi L. Eisenhut
*Attorney, Agent, or Firm*—Burns, Doane, Swecker & Mathis, LLP

[57] ABSTRACT

A liquid crystal display comprises a liquid crystal cell of a vertical alignment mode, one or two optical compensatory sheets arranged on one or both sides of the liquid crystal cell and two polarizing elements arranged on the optical compensatory sheets or the liquid crystal cell. The liquid crystal cell contains a liquid crystal molecule. The liquid crystal molecule is essentially vertically aligned while not applying voltage to the cell, and is essentially horizontally aligned while applying voltage to the cell. The optical compensatory sheet comprises a transparent substrate and an optically anisotropic layer. The optically anisotropic layer contains a discotic compound. The optically anisotropic layer has an optical anisotropy to optically compensate an optical anisotropy of the liquid crystal cell while applying voltage to the cell. The optical compensatory sheet has a retardation value in plane in the range of −10 to 10 nm.

19 Claims, 6 Drawing Sheets

HOMEOTROPIC LIQUID CRYSTAL CELL WITH ONE OR MORE COMPENSATOR PLATES WITH A SMALL BIREFRINGENCE

FIELD OF THE INVENTION

The present invention relates to a liquid crystal display using a liquid crystal cell of a vertical alignment (VA) mode, in which a liquid crystal molecule is essentially vertically aligned while not applying voltage to the cell, and is essentially horizontally aligned while applying voltage to the cell.

BACKGROUND OF THE INVENTION

A liquid crystal display (LCD) has advantages of thin shape, light weight and low consumption of electric power, compared with a cathode ray tube (CRT). Most of the commercially available liquid crystal displays usually use a twisted nematic liquid crystal. A liquid crystal display mode is classified into a birefringent mode and an optical rotatory mode.

In a liquid crystal display of a birefringent mode, alignment of liquid crystal molecules is twisted over 90°. The transmittance of the super twisted nematic (STN) liquid crystal display is changed abruptly over a threshold voltage when applying voltage to the cell. Accordingly, the liquid crystal display of the birefringent mode can display a large image by a time-sharing addressing method, even though an electrode consists of a simple matrix without an active matrix (such as a thin layer transistor or diode). However, the liquid crystal display using the super twisted liquid crystal molecule has a slow response speed (several hundreds milliseconds). Further, it is difficult for the simple matrix to display a gray scale image.

A liquid crystal display having an active matrix (e.g., TFT-LCD, MIM-LCD) uses a liquid crystal molecule twisted at 90° of an optical rotatory mode. The twisted nematic liquid crystal display (TN-LCD) has a fast response speed (several ten milliseconds). Further, the TN-LCD can display an image of high contrast. Therefore, the TN-LCD is predominant over commercially available liquid crystal displays.

Color and contrast in an image displayed in a conventional liquid crystal display depend on the viewing angle. A liquid crystal display is inferior to CRT in the viewing angle dependence.

An optical compensatory sheet is used to remove color formed in a liquid crystal cell. An optical compensatory sheet of a specific optical characteristic has another function of enlarging a viewing angle of a liquid crystal display.

A stretched birefringent film has been used as the optical compensatory sheet. Japanese Patent Provisional Publication No. 6(1994)-75116 and European Patent No. 576,304A1 disclose an optically negative uniaxial compensatory sheet (a stretched birefringent film) having an inclined optic axis. The optical compensatory sheet has the function of enlarging a viewing angle.

It has been proposed to use an optical compensatory sheet comprising a transparent substrate and an optically anisotropic layer in place of the stretched birefringent film. The optically anisotropic layer is usually formed by aligning discotic compounds and fixing the aligned compounds. The discotic compounds usually have a large bire-fringence. The discotic compounds have various alignment forms. Therefore, an optical compensatory sheet using the discotic compounds can have a specific optical characteristic that cannot be obtained by the conventional stretched birefringent film. Japanese Patent Provisional Publication No. 6(1994)-214116, and U.S. Pat. Nos. 5,583,679, 5,646,703 disclose the optical compensatory sheet using the discotic compounds.

The viewing angle of the liquid crystal display can be improved by using the above-mentioned optical compensatory sheet. However, the improved viewing angle is still inferior to that of CRT.

SUMMARY OF THE INVENTION

Japanese Patent Provisional Publication No. 2(1990)-176625 discloses a liquid crystal display using a liquid crystal cell of a vertical alignment (VA) mode, in which liquid crystal molecules are essentially vertically aligned while not applying voltage to the cell, and are essentially horizontally aligned while applying voltage to the cell. The vertical alignment liquid crystal mode is characterized in a wide viewing angle and a fast response, compared with the conventional liquid crystal modes. A prototype of the liquid crystal display of a vertical alignment mode has been exhibited (Nikkei Microdevice (written in Japanese), No. 136, page 147, 1996).

Though the liquid crystal display of a vertical alignment mode has a wide viewing angle compared with the conventional liquid crystal displays, a further improvement is necessary to be comparable with CRT.

It might be considered that an optical compensatory sheet is used to improve the viewing angle of the liquid crystal display of a vertical alignment mode in the same manner as in the conventional liquid crystal displays. However, the known optical compensatory sheets used in the conventional liquid crystal displays are not effective, or cause a serious problem in the liquid crystal display of a vertical alignment mode.

Even if the liquid crystal display of a vertical alignment mode has a stretched birefringent film (for example, an optically negative uniaxial compensatory sheet having an optic axis parallel to a normal line of the film) as an optical compensatory sheet, the viewing angle would scarcely be improved.

It has been proposed to use an optical compensatory sheet comprising a transparent substrate and an optically anisotropic layer containing a discotic compound in place of the stretched birefringent film. However, the known optical compensatory sheet using the discotic compound causes a problem on a front contrast of a displayed image (a contrast of an image when the image is viewed along the normal line of the image) when the liquid crystal display of a vertical alignment mode is used as a normally black mode.

According to vertical alignment mode, liquid crystal molecules are essentially horizontally aligned to display white or half tone by applying voltage to the cell. The optical compensatory sheet needs a certain optical anisotropy to optically compensate an optical anisotropy of the liquid crystal cell while applying voltage to the cell. As a result, an optically anisotropic layer of the sheet has a certain retardation value in plane.

On the other hand, a retardation value in plane can be reduced as possible to display black while not applying voltage to the cell. If the retardation value is large, the transmittance increases to degrade the front contrast when a black and white image is displayed.

If the above-mentioned two requirements, which seems to be inconsistent are not satisfied, an optical compensatory sheet causes a problem on an image displayed on a liquid crystal cell of a vertical alignment mode. In practice, the known optical compensatory sheet degrades the contrast of the image of the vertical alignment mode.

An object of the present invention is to further improve the excellent viewing angle of a liquid crystal display of a vertical alignment mode without degrading a front contrast of an image.

Another object of the invention is to provide an optical compensatory sheet suitable for a liquid crystal display of a vertical alignment mode.

The present invention provides a liquid crystal display comprising a liquid crystal cell of a vertical alignment mode, two optical compensatory sheets arranged on both sides of the liquid crystal cell and two polarizing elements arranged on the optical compensatory sheets, said liquid crystal cell containing liquid crystal molecules, which are essentially vertically aligned while not applying voltage to the cell, and are essentially horizontally aligned while applying voltage to the cell, wherein each of the optical compensatory sheets comprises a transparent substrate and an optically anisotropic layer containing a discotic compound, said optically anisotropic layer having an optical anisotropy to optically compensate an optical anisotropy of the liquid crystal cell while applying voltage to the cell, and each of said optical compensatory sheets having a retardation value in plane in the range of −5 to 5 nm.

The invention also provides a liquid crystal display comprising a liquid crystal cell of a vertical alignment mode, an optical compensatory sheets arranged on one side of the liquid crystal cell and two polarizing elements arranged on the liquid crystal cell and the optical compensatory sheet, said liquid crystal cell containing liquid crystal molecules, which are essentially vertically aligned while not applying voltage to the cell, and are essentially horizontally aligned while applying voltage to the cell, wherein the optical compensatory sheet comprises a transparent substrate and an optically anisotropic layer containing a discotic compound, said optically anisotropic layer having an optical anisotropy to optically compensate an optical anisotropy of the liquid crystal cell while applying voltage to the cell, and said optical compensatory sheet having a retardation value in plane in the range of −10 to 10 nm.

The invention further provides an optical compensatory sheet comprising a transparent substrate and an optically anisotropic layer containing a discotic compound, wherein the optically anisotropic layer and the transparent substrate are so arranged that slow axis of the optically anisotropic layer is essentially perpendicular to slow axis of the transparent substrate, and each of the optically anisotropic layer and the transparent substrate has retardation in plane satisfying the following formula:

$$|Re^1 - Re^2| \leq 10 \text{ nm}$$

in which $Re^1$ is an absolute retardation value of the optically anisotropic layer in plane and $Re^2$ is an absolute retardation value of the transparent substrate in plane.

In the present specification, the term "essentially vertically (or horizontally) aligned" and the term "essentially perpendicular" mean that a margin for error based on the exactly vertical, horizontal or perpendicular angle is in the range of ±20°. The margin for error is preferably in the range of ±15°, more preferably in the range of ±10°, and most preferably in the range of ±5°.

In the specification, alignment of liquid crystal molecules means that the average aligned angle of the compounds is included in the above-mentioned range, even if aligned angles of some compounds are outside the range. In practice, all the liquid crystal molecules are not always aligned along a single direction, as is described below.

In the specification, the term "slow axis" means the direction showing the maximum refractive index.

The present inventor has studied a liquid crystal display of a vertical alignment mode and an optical compensatory sheet, and has found that two optical characteristics (a certain optical anisotropy while applying voltage to the cell and a small retardation value in plane while not applying voltage to the cell) required for an optical compensatory sheet used in a liquid crystal display of a vertical alignment mode can be satisfied without inconsistency.

The optically anisotropic layer of the optical compensatory sheet needs a certain optical anisotropy to optically compensate an optical anisotropy of the liquid crystal cell while applying voltage to the cell. Even if voltage is applied to the liquid crystal cell, some liquid crystal molecules are obliquely aligned (not horizontally aligned). The obliquely aligned liquid crystal molecules cause a positive optical anisotropy in a liquid crystal cell. As a result, the optical characteristic (viewing angle) of the cell is asymmetric. The positive optical anisotropy is compensated by an optically anisotropic layer, in more detail by a negative optical anisotropy of a discotic compound. The discotic compound is aligned corresponding to the alignment of the liquid crystal molecule of the cell. Therefore, the optically anisotropic layer containing the discotic compound has a certain retardation value in plane.

On the other hand, a retardation value in plane can be reduced when voltage is not applied to the cell. In the case that two optical compensatory sheets are arranged on both sides of the liquid crystal cell (the first embodiment of the present invention), each of the optical compensatory sheets should have a retardation value in plane in the range of −5 to 5 nm. In the case that one optical compensatory sheet is arranged on one side of the liquid crystal cell (the second embodiment of the present invention), the optical compensatory sheet should have a retardation value in plane in the range of −10 to 10 nm. Even though the optically anisotropic layer has a certain retardation value in plane, the retardation value in plane of the optical compensatory sheet can be reduced by adjusting a retardation value in plane of a transparent substrate and arranging the directions of the optically anisotropic layer and the transparent substrate. The retardation value in plane of the transparent substrate can easily be adjusted by stretching (preferably biaxially stretching) a transparent film.

For the reasons mentioned above, the excellent viewing angle of a liquid crystal display of a vertical alignment mode is further improved in the liquid crystal display of the present invention without degrading the contrast of the image.

DETAILED DESCRIPTION OF THE INVENTION

Figure 1:
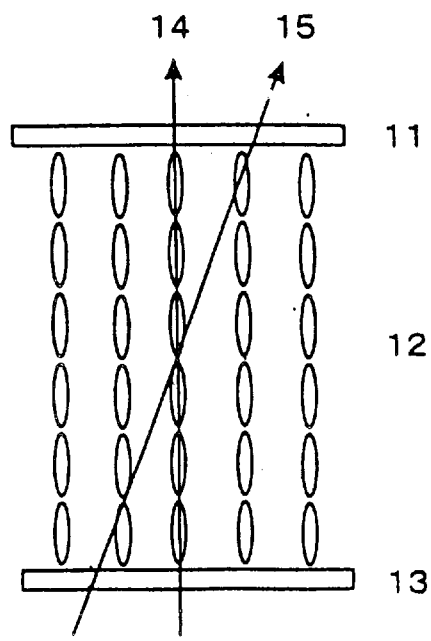
FIG. 1 is a sectional view schematically illustrating alignment of liquid crystal molecules when voltage is not applied to a vertically aligned liquid crystal cell.

A liquid crystal display of a vertical alignment mode and an optical compensatory sheet are described by referring to the drawings.

FIG. 1 is a sectional view schematically illustrating alignment of liquid crystal molecules when voltage is not applied to a vertically aligned (VA) liquid crystal cell.

As is shown in FIG. 1, a liquid crystal cell comprises an upper substrate (11), a lower substrate (13) and liquid crystal molecules (12) sealed between the substrates. The liquid crystal molecules (12) used in a VA liquid crystal cell generally has a negative dielectric constant anisotropy. When voltage is not applied to a VA liquid crystal cell, the liquid crystal molecules (12) are vertically aligned. Where a pair of polarizing elements (not shown in FIG. 1) are arranged on both sides of the upper and lower substrates (11, 13), no retardation is caused along a normal line (14) of the substrate surface. As a result, light is not transmitted along the normal line (14) to display black.

If the cell is viewed along a direction (15) inclined from the normal line (14), retardation is caused to transmit light. As a result, a contrast of an image is degraded. The retardation along the inclined direction (15) can be compensated with an optical anisotropy of an optical compensatory sheet. The details are described below referring to FIG. 4.

FIG. 1 shows that all the liquid crystal molecules (12) are completely vertically aligned. However, the aligned compounds are slightly slanted (pretilted) to a direction. The slanted compounds can be aligned to the pretilted direction when voltage is applied to a VA liquid crystal cell (described below referring to FIG. 2).

Figure 2:
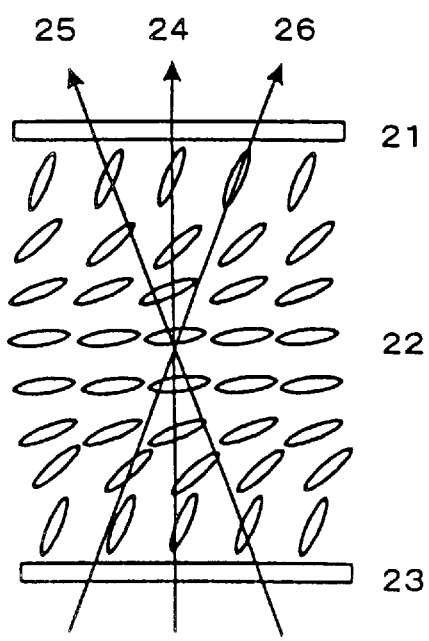
FIG. 2 is a sectional view schematically illustrating alignment of liquid crystal molecules when voltage is applied to a vertically aligned liquid crystal cell.

FIG. 2 is a sectional view schematically illustrating alignment of liquid crystal molecules when voltage is applied to a vertically aligned (VA) liquid crystal cell.

Each of an upper substrate (21) and a lower substrate (23) has an electrode layer (not shown in FIG. 2) to apply voltage to liquid crystal molecules (22). As is shown in FIG. 2, the liquid crystal molecules placed in the middle of the cell are horizontally aligned by applying voltage to the cell. As a result, retardation is caused along a normal line (24) of the substrate surface to transmit light.

Each of an upper substrate (21) and a lower substrate (23) further has an orientation layer (not shown in FIG. 2) having a function of aligning the liquid crystal molecules (22) vertically. Accordingly, the liquid crystal molecules near the orientation layer are not horizontally aligned, but obliquely aligned along a pretilted direction, though the molecules placed in the middle of the cell are horizontally aligned. If the cell is viewed along a direction (25) inclined from the normal line (24), change of the angle of retardation is relatively small. On the other hand, change of the angle of retardation is relatively large where the cell is viewed along another direction (26). If the pretilted direction (the same as 26) is placed along downward direction in an image, viewing angles along leftward and rightward directions would be wide and symmetrical, a viewing angle along a downward direction would be wide, but a viewing angle an upward direction would be narrow so that the viewing angles along downward and upward directions would be asymmetrical. The retardation caused by the obliquely (not horizontally) aligned liquid crystal molecules while applying voltage to the cell should be compensated to correct the asymmetrical viewing angles (asymmetrical transmittance).

The optical compensatory sheet of the present invention has a function of compensating the above-mentioned retardation to improve the viewing angle (correcting the asymmetrical viewing angle while applying voltage to the cell).

Figure 3:
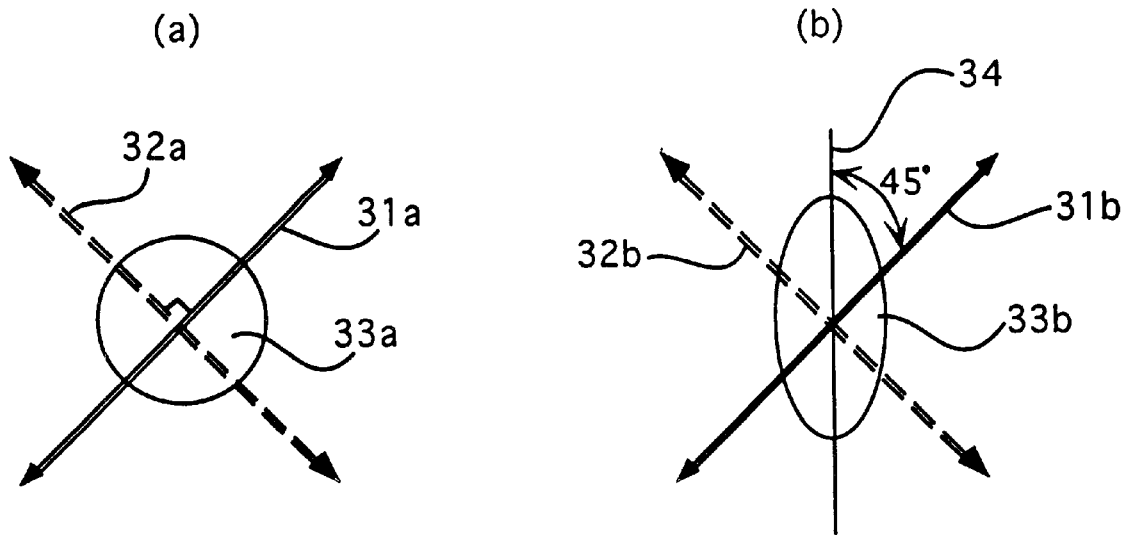
FIG. 3 schematically illustrates a refractive index ellipsoid obtained by viewing a liquid crystal cell vertical alignment mode and a polarizing element of crossed nicols arrangement along a normal line of a cell substrate.

FIG. 3 schematically illustrates a refractive index ellipsoid obtained by viewing a liquid crystal cell of a vertical alignment mode and a polarizing element of crossed nicols arrangement along a normal line of a cell substrate. FIG. 3(a) shows a refractive index ellipsoid when voltage is not applied to the cell, and FIG. 3(b) shows a refractive index ellipsoid when voltage is applied to the cell.

As is shown in FIG. 3, a transmission axis on an incident side (31a, 31b) of a polarizing element is arranged perpendicular to a transmission axis on the other side (32a, 32b) of a polarizing element according to crossed nicols arrangement.

The liquid crystal molecules are vertically aligned (perpendicular to the substrate surface) when voltage is not applied to the cell. A refractive index ellipsoid (33a) has a circular shape shown in FIG. 3(a) when voltage is not applied to the cell. Therefore, the liquid crystal cell having no retardation shown in FIG. 3(a) does not transmit light.

On the other hand, most of the liquid crystal molecules are horizontally aligned (parallel to the substrate surface) when voltage is applied to the cell. A refractive index ellipsoid (33b) has an oval shape shown in FIG. 3(b) when voltage is applied to the cell. Therefore, the liquid crystal cell having a retardation shown in FIG. 3(b) transmits light along a direction (34), which is an orthographic projection of an optic axis of the liquid crystal molecule in the cell to the cell substrate surface.

Figure 4:
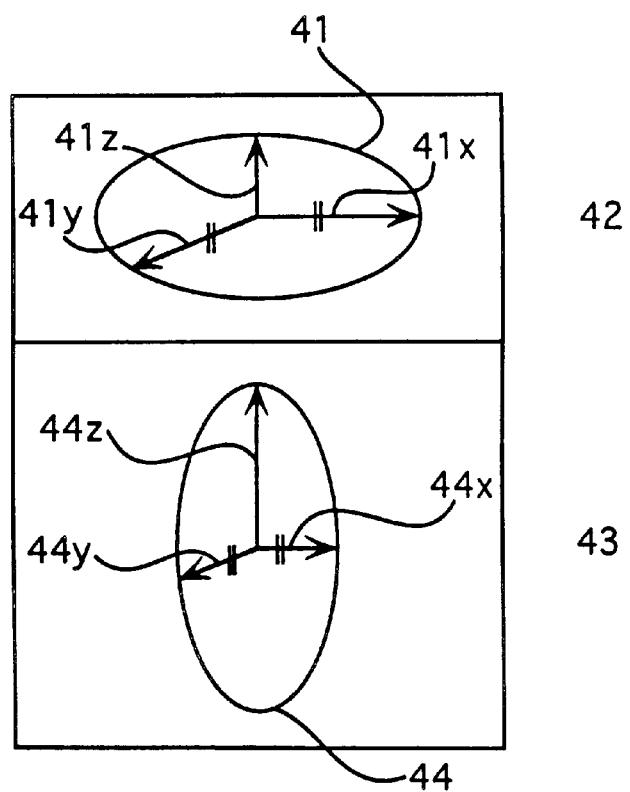
FIG. 4 schematically illustrates a refractive index ellipsoid of a positive uniaxial liquid crystal cell and a refractive index ellipsoid of a negative uniaxial optical compensatory sheet.

FIG. 4 schematically illustrates a refractive index ellipsoid of a positive uniaxial liquid crystal cell and a refractive index ellipsoid of a negative uniaxial optical compensatory sheet.

Where a positive uniaxial optical anisotropy is caused in a liquid crystal cell (43), a refractive index ellipsoid (44), which is formed by refractive indexes in plane (44x, 44y) and a refractive index along a vertical direction (44z) has a shape like a standing football. If a liquid crystal cell having a football-like (not spherical) refractive index ellipsoid is viewed along an inclined direction (15 in FIG. 1), retardation is caused in the cell. The retardation is canceled by a negative uniaxial optical compensatory sheet (42) to prevent transmission of light.

The negative uniaxial optical compensatory sheet (42) has a refractive index ellipsoid (41) having a shape like a pressed beach ball, which is formed by refractive indexes in plane (41x, 41y) and a refractive index along a vertical direction (41z). Therefore, the sum of 41x and 44x, the sum of 41y and 44y and the sum 41z and 44z are identical values. As a result, the retardation caused in the liquid crystal cell is canceled.

The optical compensatory sheet of the present invention has another function of preventing transmission of light incident from an inclined direction when voltage is not applied to the cell as well as a function of improving the viewing angle when voltage is not applied to the cell (described above referring to FIG. 2).

Figure 5:
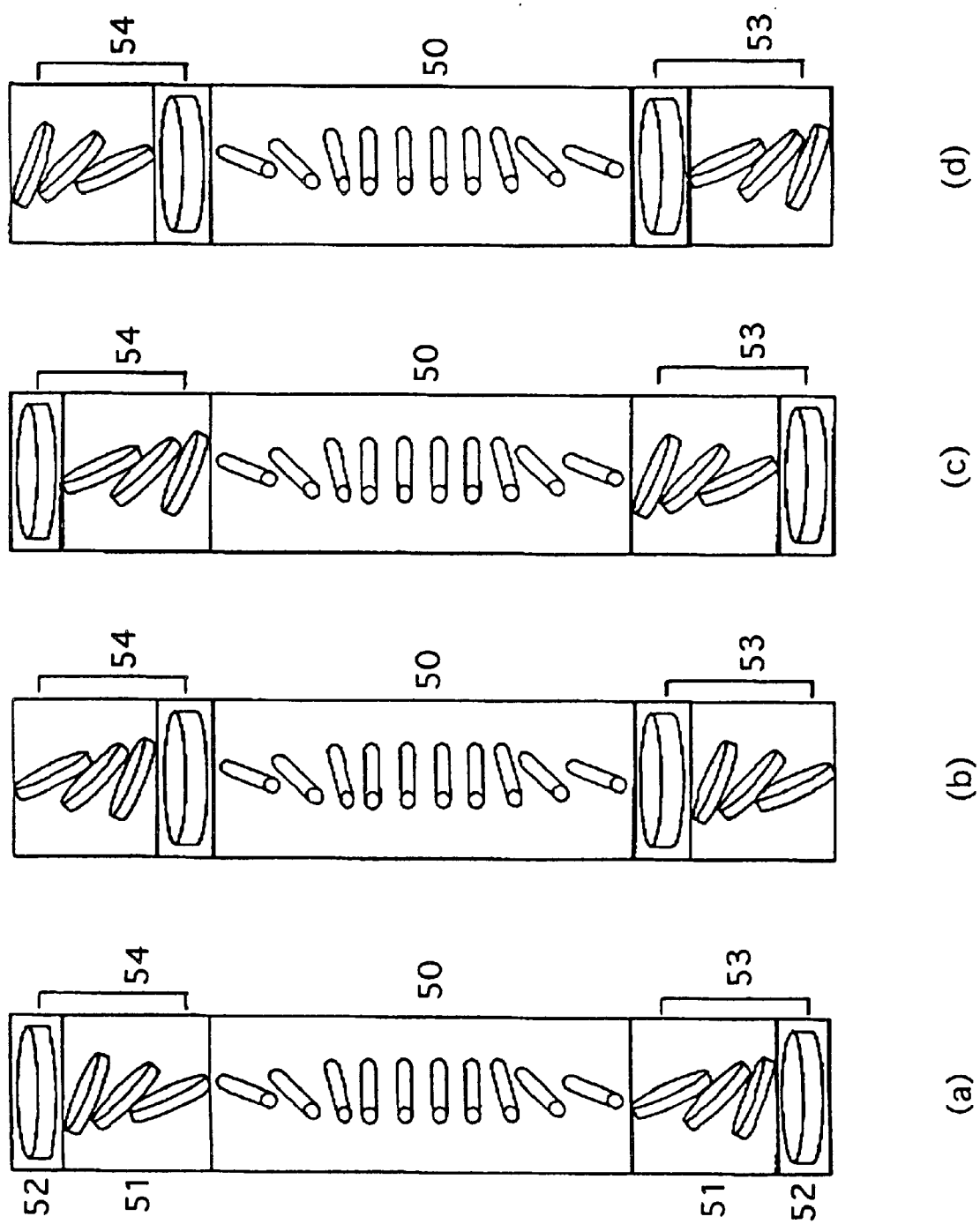
FIG. 5 is a sectional view schematically illustrating combinations of a liquid crystal cell of a vertical alignment mode and an optical compensatory sheet of the first embodiment of the present invention.

FIG. 5 is a sectional view schematically illustrating combinations of a liquid crystal cell of a vertical alignment mode and an optical compensatory sheet of the first embodiment of the present invention.

As is shown in FIG. 5, the optical compensatory sheets (53, 54) of the first embodiment are combined with a VA liquid crystal cell (50) according to four variations (a) to (d).

According to the variations (a) and (c), optically anisotropic layers (51) containing a discotic compound of the optical compensatory sheets (53, 54) are attached to the VA liquid crystal cell (50). In the variation (a), the discotic compound is aligned by an orientation layer (not shown in FIG. 5) arranged between the optically anisotropic layer (51) and the transparent substrate (52). In the variation (c), the discotic compound is aligned by an orientation layer (not shown in FIG. 5) arranged between the optically anisotropic layer (51) and the VA liquid crystal cell (50).

According to the variations (b) and (d), transparent substrates (52) of the optical compensatory sheets (53, 54) are attached to the VA liquid crystal cell (50). In the variation (b), the discotic compound is aligned by an orientation layer (not shown in FIG. 5) arranged between the optically anisotropic layer (51) and the transparent substrate (52). In the variation (c), the discotic compound is aligned by an orientation layer (not shown in FIG. 5) arranged outside the optically anisotropic layer (51).

Figure 6:
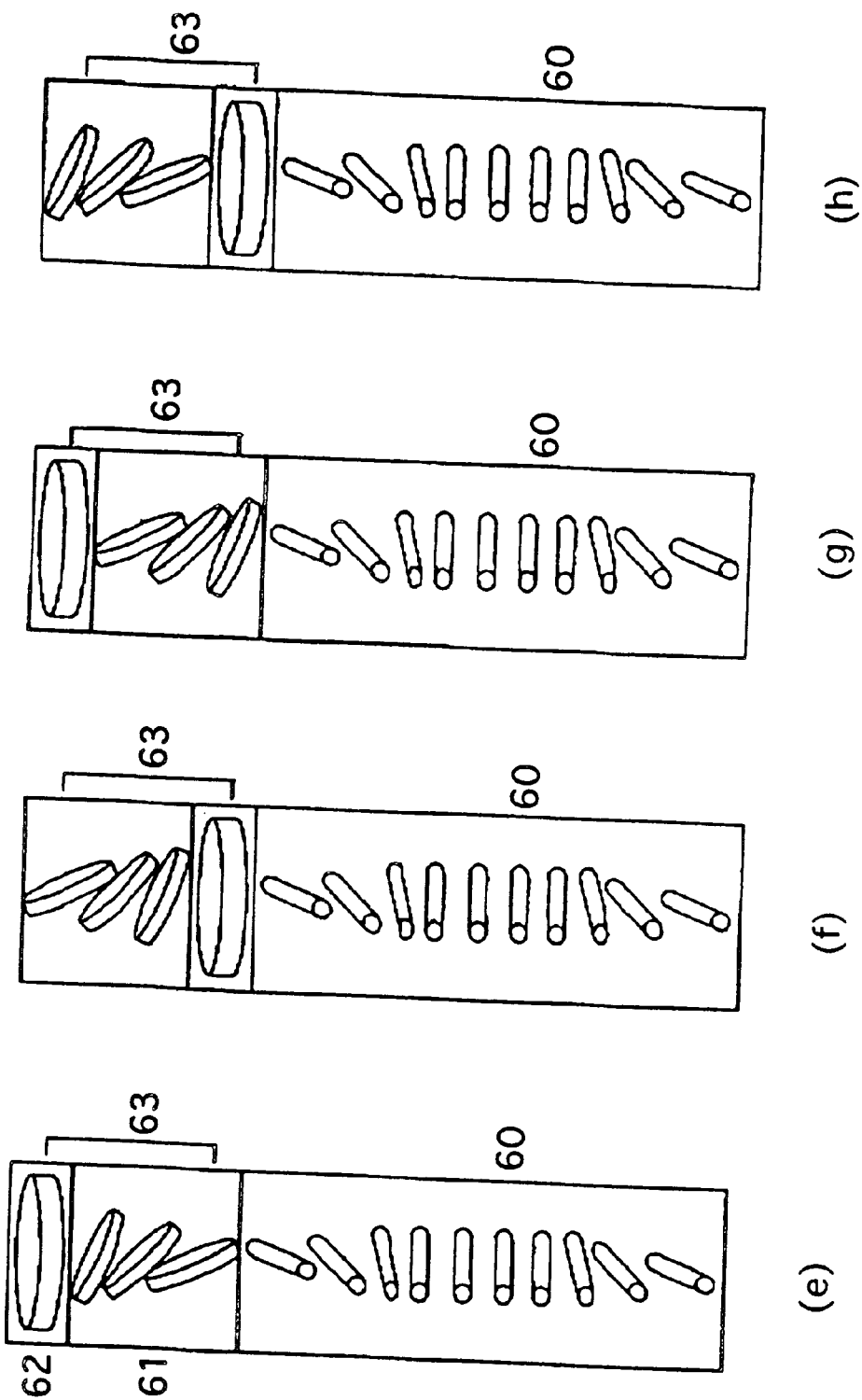
FIG. 6 is a sectional view schematically illustrating combinations of a liquid crystal cell of a vertical alignment mode and an optical compensatory sheet of the second embodiment of the present invention.

FIG. 6 is a sectional view schematically illustrating combinations of a liquid crystal cell of a vertical alignment mode and an optical compensatory sheet of the second embodiment of the present invention.

As is shown in FIG. 6, the optical compensatory sheet (63) of the second embodiment is combined with a VA liquid crystal cell (60) according to four variations (e) to (h).

According to the variations (e) and (g), an optically anisotropic layer (61) containing a discotic compound of the optical compensatory sheet (63) is attached to the VA liquid crystal cell (60). In the variation (e), the discotic compound is aligned by an orientation layer (not shown in FIG. 6) arranged between the optically anisotropic layer (61) and the transparent substrate (62). In the variation (g), the discotic compound is aligned by an orientation layer (not shown in FIG. 6) arranged between the optically anisotropic layer (61) and the VA liquid crystal cell (60).

According to the variations (f) and (h), a transparent substrate (62) of the optical compensatory sheet (63) is attached to the VA liquid crystal cell (60). In the variation (f), the discotic compound is aligned by an orientation layer (not shown in FIG. 6) arranged between the optically anisotropic layer (61) and the transparent substrate (62). In the variation (h), the discotic compound is aligned by an orientation layer (not shown in FIG. 6) arranged outside the optically anisotropic layer (61).

Figure 7:
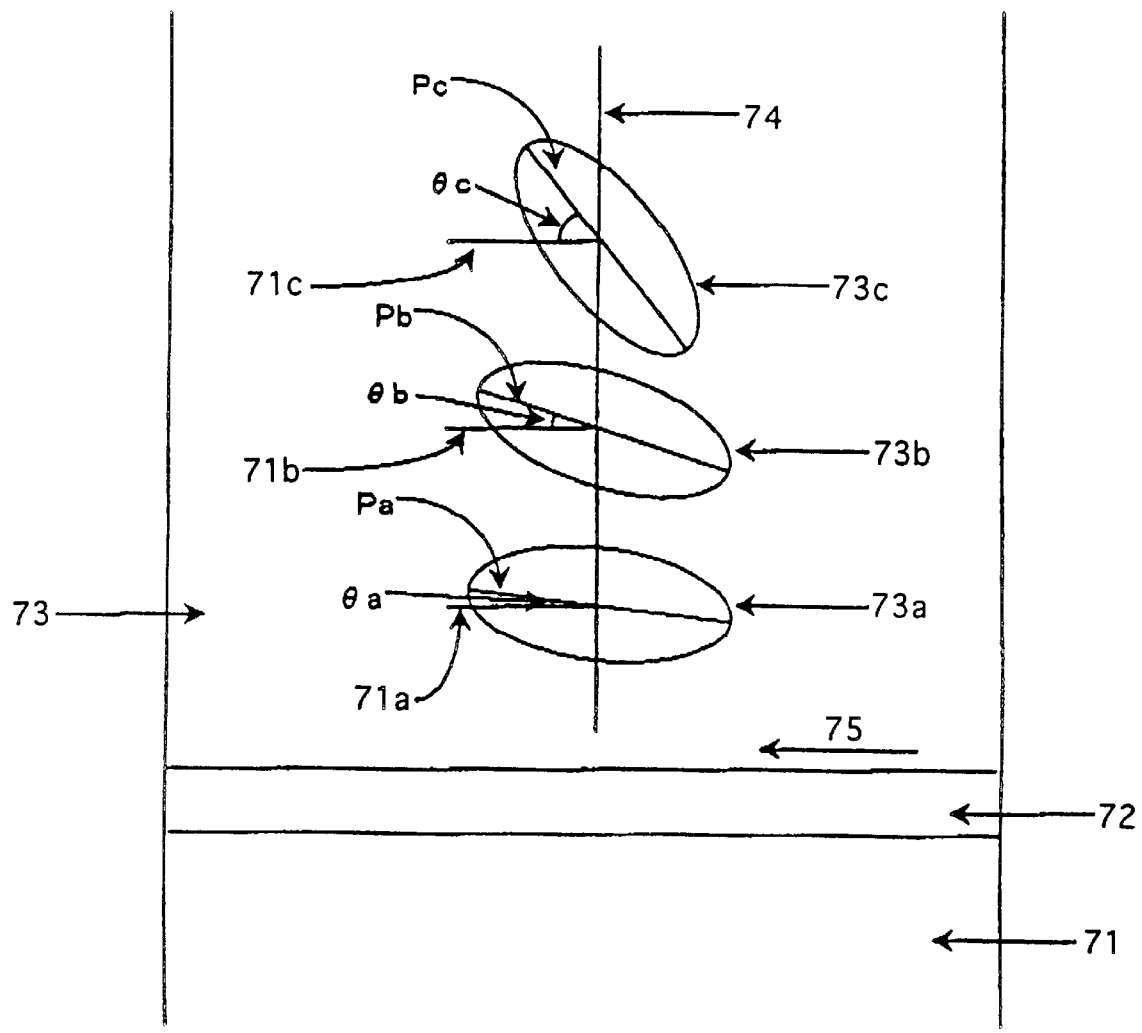
FIG. 7 is a sectional view schematically illustrating a representative embodiment of an optical compensatory sheet.

FIG. 7 is a sectional view schematically illustrating a representative embodiment of an optical compensatory sheet.

The optical compensatory sheet shown in FIG. 7 comprises a transparent substrate (71), an orientation layer (72) and an optically anisotropic layer (73) in the order. The layered structure corresponds to (a) and (b) in FIG. 5 and (e) and (f) in FIG. 6. The orientation layer (72) has an aligning function caused by rubbing the layer along a direction (75).

Discotic compounds (73a, 73b, 73c) contained in the optically anisotropic layer (73) are planer molecules. Each of the molecules has only one plane, namely discotic plane (Pa, Pb, Pc). The discotic planes (Pa, Pb, Pc) are inclined to planes (71a, 71b, 71c) parallel to the surface of the transparent substrate (71). The angle between the discotic planes (Pa, Pb, Pc) and the paralleled planes (71a, 71b, 71c) are inclined angles ($\theta a$, $\theta b$, $\theta c$). As the distance between the molecule and the orientation layer (72) increases along a normal line (74) of the transparent substrate (71), the inclined angles increases ($\theta a < \theta b < \theta c$).

The inclined angles ($\theta a$, $\theta b$, $\theta c$) are preferably in the range of 0 to 60°. The minimum inclined angle is preferably in the range of 0 to 55°, and more preferably in the range of 5 to 40°. The maximum inclined angle is preferably in the range of 5 to 60°, and more preferably in the range of 20 to 60°. The difference between the minimum and maximum angles is preferably in the range of 5 to 55°, and more preferably in the range of 10 to 40°.

An optical compensatory sheet has a function of improving the viewing angle. The function can be further improved where the inclined angles are changed as is shown in FIG. 7. The optical compensatory sheet shown in FIG. 7 has another function of preventing an image from reversion, gray-scale inversion and color contamination of a displayed image.

Figure 8:
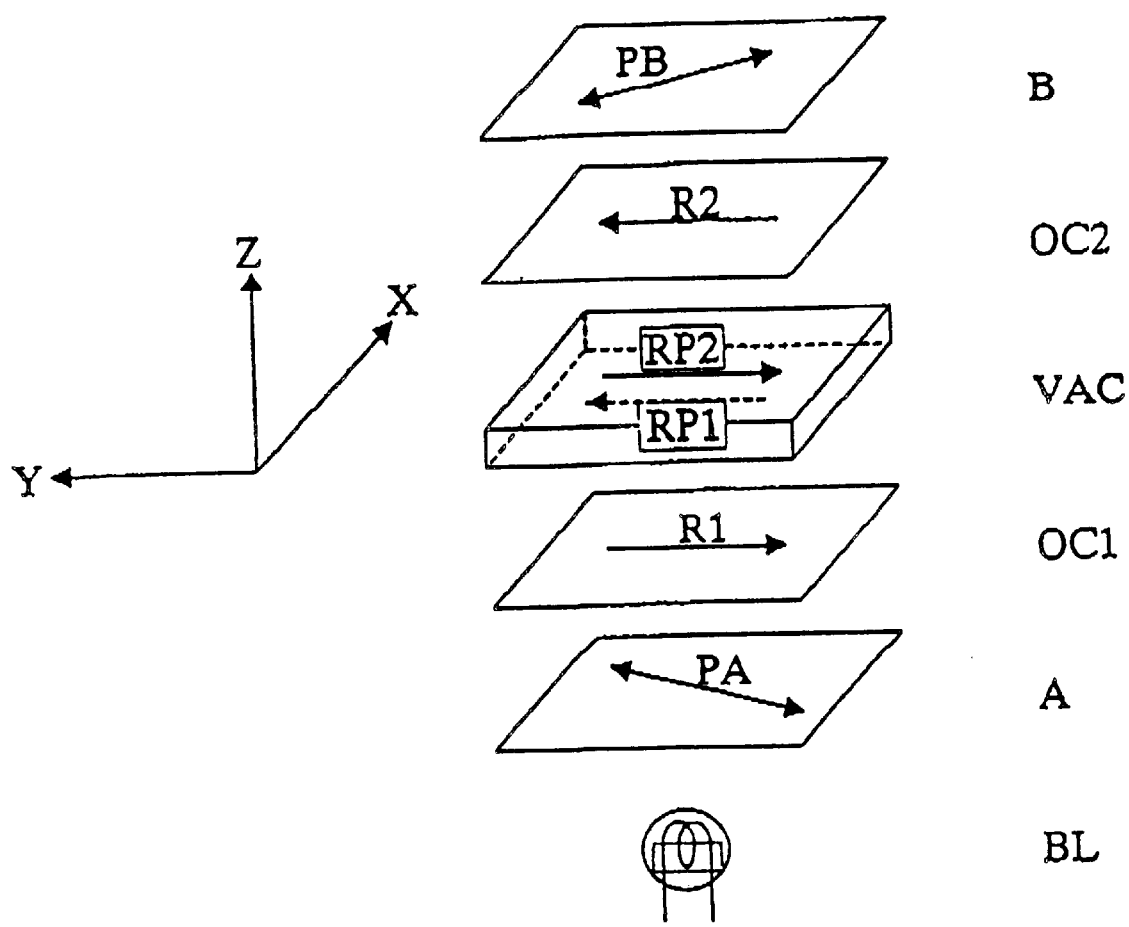
FIG. 8 is a sectional view schematically illustrating a representative embodiment of a liquid crystal display.

FIG. 8 is a sectional view schematically illustrating a representative embodiment of a liquid crystal display.

The liquid crystal display shown in FIG. 8 comprises a liquid crystal cell of a vertical alignment mode (VAC), a pair of polarizing elements (A, B) arranged on both sides of the liquid crystal cell, a pair of optical compensatory sheets (OC1, OC2) arranged between the liquid crystal cell and the polarizing elements, and a back light (BL). According to the first embodiment of the present invention, the pair of the optical compensatory sheets (OC1, OC2) are arranged, as is shown in FIG. 8. However, only one optical compensatory sheet can be arranged on one side of the liquid crystal cell (the second embodiment of the present invention).

The arrows (R1, R2) in the optical compensatory sheets (OC1, OC2) mean rubbing directions of orientation layers (corresponding to the arrow 75 in FIG. 7) provided on the optical compensatory sheets. In the liquid crystal display shown in FIG. 8, an optically anisotropic layers of the optical compensatory sheets (OC1, OC2) are attached to the liquid crystal cell (VAC). The optically anisotropic layers can also be attached to the polarizing elements (A, B). The rubbing directions of an orientation layer (R1, R2) should be reversed where the optically anisotropic layers are attached to the polarizing elements.

The arrows (RP1, RP2) in the liquid crystal cell (VAC) mean the rubbing directions of orientation layers provided on the cell substrates.

The arrows (PA, PB) in the polarizing elements (A, B) mean the transmission axes of light polarized in the elements.

The rubbing directions in the optical compensatory sheets (R1, R2) is preferably essentially parallel (or reversely parallel) to the rubbing directions in the liquid crystal cell (RP1, RP2). The transmission axes of the polarizing elements (PA, PB) are preferably essentially parallel or perpendicular to each other.

The term "essentially parallel (or reversely parallel) or perpendicular" means that a margin for error based on the exactly parallel (or reversely parallel) or perpendicular angle is in the range of ±20°. The margin for error is preferably in the range of ±15°, more preferably in the range of ±10°, and most preferably in the range of ±5°.

The angle between the rubbing directions in the liquid crystal cell (RP1, RP2) and the transmission axes of the polarizing elements (PA, PB) is preferably in the range of 10 to 80°, more preferably in the range of 20 to 700, and most preferably in the range of 35 to 55°.

[Optical compensatory sheet]

The optical compensatory sheet comprises a transparent substrate and an optically anisotropic layer containing a discotic compound.

The optical compensatory sheet has a direction of the minimum retardation, which is preferably not present in plane and not present along a normal line of the sheet.

The optical characteristic of the optical compensatory sheet depends on optical characteristics of the optically anisotropic layer and the transparent substrate and on arrangement of the layer and the substrate. The optical characteristics are described below.

The optical characteristics of (1) the optical anisotropic layer, (2) the transparent substrate and (3) the optical compensatory sheet include an absolute retardation value in plane (Re), an absolute Rth retardation value (Rth) and an angle between a direction of the minimum retardation and a normal line of the sheet ($\beta$).

The absolute retardation value in plane (Re) is defined in the following formula:

$$Re = |\{(nx - ny) \times d\}|$$

in which each of nx and ny is the principal refractive index in plane (of the optical anisotropic layer, the transparent substrate or the optical compensatory sheet), and d is the thickness (of the optical anisotropic layer, the transparent substrate or the optical compensatory sheet).

The absolute Rth retardation value (Rth) is defined in the following formula:

$$Rth = |[\{(n1+n2)/2\} - n3] \times d|$$

in which each of n1, n2 and n3 is the principal refractive index in a refractive index ellipsoid approximately obtained from optical anisotropy (of the optical anisotropic layer, the transparent substrate or the optical compensatory sheet), n3 is the minimum index, and d is the thickness (of the optical anisotropic layer, the transparent substrate or the optical compensatory sheet). If the inclined angle of the discotic compound were 0°, each of n1 and n2 would correspond to the principal refractive index in plane (of the optical anisotropic layer or the transparent substrate), and n3 would correspond to the principal refractive index (of the optical anisotropic layer or the transparent substrate).

According to the first embodiment of the present invention, the optical compensatory sheet has a retardation value in plane in the range of −5 to 5 nm. Therefore, the absolute retardation value in plane of the optical compensatory sheet ($Re^{31}$) should satisfy the formula of $0 < R^{31} < 5$.

The optically anisotropic layer and the transparent substrate are preferably so arranged that slow axis of the optically anisotropic layer is essentially perpendicular to slow axis of the transparent substrate to adjust $Re^{31}$ within the above-mentioned range. Further, each of the optically anisotropic layer and the transparent substrate preferably has retardation in plane satisfying the following formula:

$$|Re^1 - Re^2| \leq 5 \text{ nm}$$

in which $Re^1$ is an absolute retardation value in plane of the optically anisotropic layer, and $Re^2$ is an absolute retardation value in plane of the transparent substrate.

According to the second embodiment of the present invention, the optical compensatory sheet has a retardation value in plane in the range of −10 to 10 nm. Therefore, the absolute retardation value in plane of the optical compensatory sheet ($Re^{32}$) should satisfy the formula of $0 \leq R^{32} \leq 10$.

The optically anisotropic layer and the transparent substrate are preferably so arranged that slow axis of the optically anisotropic layer is essentially perpendicular to slow axis of the transparent substrate to adjust $Re^{32}$ within the above-mentioned range. Further, each of the optically anisotropic layer and the transparent substrate preferably has retardation in plane satisfying the following formula:

$$|Re^1 - Re^2| \leq 10 \text{ nm}$$

in which $Re^1$ is an absolute retardation value in plane of the optically anisotropic layer, and $Re^2$ is an absolute retardation value in plane of the transparent substrate.

Preferred optical characteristics of (1) the optical anisotropic layer, (2) the transparent substrate and (3) the optical compensatory sheet are shown below. The unit of Re and Rth is nm. The superscripted number 1 means a value of the optical anisotropic layer, the superscripted number 2 means a value of the transparent substrate and the superscripted number 3 means a value of the optical compensatory sheet. The meanings of $R^{31}$ and $R^{32}$ are described above.

| Preferred range | More preferred | Most preferred |
|---|---|---|
| $0 < Re^1 \leq 200$ | $5 \leq Re^1 \leq 150$ | $10 \leq Re^1 \leq 100$ |
| $0 \leq Re^2 \leq 200$ | $5 \leq Re^2 \leq 150$ | $10 \leq Re^2 \leq 100$ |
| $0 \leq Re^{31} \leq 4.5$ | $0 \leq Re^{31} \leq 4$ | $0 \leq Re^{31} \leq 3.5$ |
| $0 \leq Re^{32} \leq 9$ | $0 \leq Re^{32} \leq 8$ | $0 \leq Re^{32} \leq 7$ |
| $10 \leq Rth^1 \leq 400$ | $20 \leq Rth^1 \leq 300$ | $30 \leq Rth^1 \leq 200$ |
| $20 \leq Rth^2 \leq 400$ | $50 \leq Rth^2 \leq 350$ | $100 \leq Rth^2 \leq 300$ |
| $10 \leq Rth^3 \leq 600$ | $60 \leq Rth^3 \leq 500$ | $100 \leq Rth^3 \leq 400$ |
| $0° < \beta^1 \leq 60°$ | $0° < \beta^1 \leq 50°$ | $0° < \beta^1 \leq 40°$ |
| $0° \leq \beta^2 \leq 10°$ | $0° \leq \beta^2 \leq 5°$ | $0° \leq \beta^2 \leq 3°$ |
| $0° < \beta^3 \leq 50°$ | $0° < \beta^3 \leq 45°$ | $0° < \beta^3 \leq 40°$ |

In the case that the optical compensatory sheet has two or more transparent substrates, the total retardation value in plane of the substrates (Re2) corresponds to the sum of the values of individual substrates.

The optical compensatory sheet preferably comprises a transparent substrate and an optically anisotropic layer, each of which have the above-mentioned optical characteristics. The optical compensatory sheet usually further comprises an orientation layer. The orientation layer is preferably arranged between the transparent substrate and the optically anisotropic layer. However, the orientation layer can also be arranged on the optically anisotropic layer. After the orientation layer aligns discotic compound contained in the optically anisotropic layer, alignment of the discotic compounds can be kept even if the orientation layer is removed from the optical compensatory sheet. Accordingly, the orientation layer is essential in the preparation of the optical compensatory sheet, but is not essential in the prepared sheet.

In the case that an orientation layer is arranged between the transparent substrate and the optically anisotropic layer, an undercoating layer (adhesive layer) is preferably further provided between the transparent substrate and the orientation layer. A protective layer may be provided on the optically anisotropic layer or on the back surface of the transparent substrate.

The optically anisotropic layer, the orientation layer and the transparent substrate are described below.

[Optically anisotropic layer]

The optically anisotropic layer contains a discotic compound. The discotic compound preferably is negative uniaxial, and preferably is obliquely aligned. The discotic compound preferably has a hybrid alignment shown in FIG. 7, wherein the inclined angles (between the discotic planes and the planes parallel to the transparent substrate) are changed along a normal line of the transparent substrate. The discotic compound has an optic axis along a normal line of the discotic plane. The birefringence along the discotic plane is larger than that along the optic axis.

An optically anisotropic layer is preferably formed by aligning a discotic compound by an orientation layer, and fixing the alignment of the discotic compound. The discotic compound is fixed preferably by a polymerization reaction.

The minimum retardation value in the optically anisotropic layer is preferably larger than 0. In other words, a direction having retardation of 0 preferably is not present in the optically anisotropic layer.

The discotic (liquid crystal) compound is described in various documents (C. Destrade et al., Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic compound is described in Japanese Patent Provisional Publication No. 8(1996)-27284.

A polymerizable group should be bound to a discotic core of the discotic compound to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic compound having a polymerizable group preferably is a compound represented by the following formula (I).

(I) D(-L-P)$_n$ in which D is a discotic core; L is a divalent linking group; P is a polymerizable group; and n is an integer of 4 to 12.

Examples of the discotic cores (D) are shown below. In the examples, LP (or PL) means the combination of the divalent linking group (L) and the polymerizable group (P).

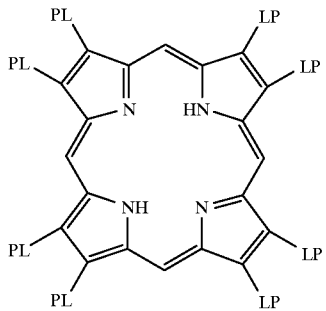
(D1)

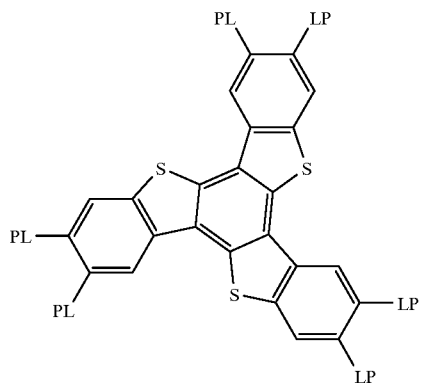
(D2)

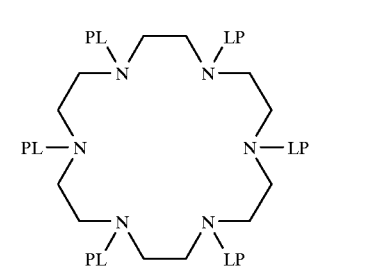
(D3)

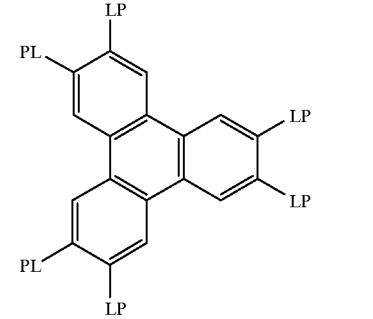
(D4)

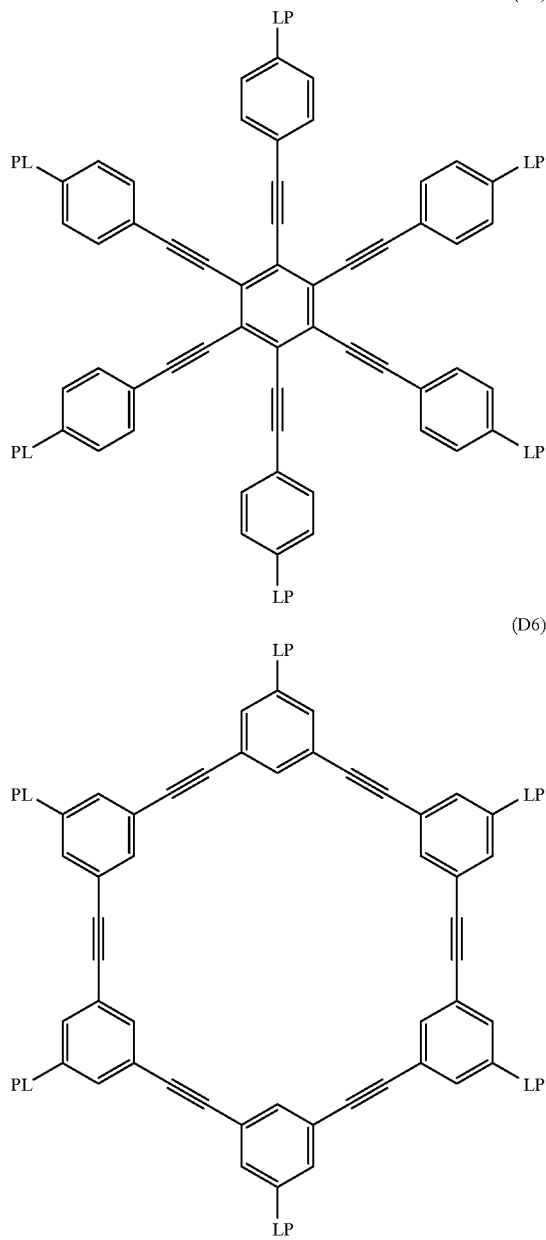

In the formula (I), the divalent linking group (L) preferably is selected from the group consisting of an alkylene group, an arylene group, —CO—, —NH—, —O—, —S— and combinations thereof. L more preferably is a divalent linking group comprising at least two divalent groups selected from the group consisting of an alkylene group, an arylene group, —CO—, —NH—, —O— and —S—. L more preferably is a divalent linking group comprising at least two divalent groups selected from the group consisting of an alkylene group, an arylene group, —CO— and —O—. The alkylene group preferably has 1 to 12 carbon atoms. The arylene group preferably has 6 to 10 carbon atoms.

Examples of the divalent linking groups (L) are shown below. In the examples, the left side is attached to the discotic core (D), and the right side is attached to the polymerizable group (P).

L1: -alkylene-CO—O-alkylene-O—CO—
L2: -alkylene-CO—O-alkylene-O—
L3: -alkylene-CO—O-alkylene-O-alkylene-
L4: -alkylene-CO—O-alkylene-
L5: —O-alkylene-O—CO—
L6: —O-alkylene-O—
L7: —O-alkylene-O—CO—NH-alkylene-
L8: —O-alkylene-S-alkylene-
L9: —O-alkylene-
L10: —CO-arylene-O-alkylene-O—CO—
L11: —CO-arylene-O-alkylene-
L12: —CO-arylene-O-alkylene-O—
L13: —CO—NH-alkylene-
L14: —NH-alkylene-O—CO—
L15: —NH-alkylene-O—
L16: —S-alkylene-S-alkylene-
L17: —S-alkylene-
L18: —S-alkylene-O—
L19: —O—CO-arylene-alkylene-O—CO—

The polymerizable group (P) is determined by the polymerization reaction. Examples of the polymerizable groups (P) are shown below.

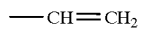 (P1)

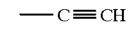 (P2)

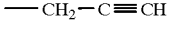 (P3)

 (P4)

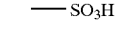 (P5)

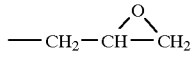 (P6)

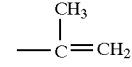 (P7)

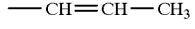 (P8)

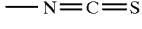 (P9)

 (P10)

 (P11)

 (P12)

 (P13)

 (P14)

The polymerizable group (P) preferably is an unsaturated polymerizable group (P1, P2, P3, P7, P8) or an epoxy group (P6), more preferably is an unsaturated polymerizable group, and most preferably is an ethylenically unsaturated group (P1, P7, P8).

In the formula (I), n is an integer of 4 to 12, which is determined by the chemical structure of the discotic core (D). The 4 to 12 combinations of L and P can be different from each other. However, the combinations are preferably identical.

An optically anisotropic layer can be formed by coating a solution containing the discotic compound, a polymerization initiator and other optional components on an orientation layer.

The optically anisotropic layer has a thickness preferably in the range of 0.5 to 100 $\mu$m, and more preferably in the range of 0.5 to 30 $\mu$m.

The aligned discotic compound is preferably fixed while keeping the alignment. The compound is fixed preferably by a polymerization reaction. The polymerization reaction can be classified a thermal reaction using a thermal polymerization initiator and a photo reaction using a photo polymerization initiator. A photo polymerization reaction is preferred.

Examples of the photo polymerization initiators include $\alpha$-carbonyl compounds (described in U.S. Pat. Nos. 2,367,661, 2,367,670), acyloin ethers (described in U.S. Pat. No. 2,448,828), $\alpha$-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution of the layer.

The light irradiation for the photo polymerization is preferably conducted by an ultraviolet ray. The exposure energy is preferably in the range of 20 to 5,000 mJ, and more preferably in the range of 100 to 800 mJ. The light irradiation can be conducted while heating the layer to accelerate the photo polymerization reaction.

[Orientation layer]

The orientation layer has a function of aligning discotic compounds. The orientation layer can be formed by rubbing treatment of an organic compound (preferably a polymer), oblique evaporation of an inorganic compound, formation of a micro groove layer, or stimulation of an organic compound (e.g., $\omega$-tricosanoic acid, dioctadecylmethylammonium chloride, methyl stearate) according to a Lang-muir-Blodgett method. Further, the aligning function of the orientation layer can be activated by applying an electric or magnetic field to the layer or irradiating the layer with light.

The orientation layer is preferably formed by rubbing a polymer. The polymer preferably is polyvinyl alcohol. A denatured polyvinyl alcohol having a hydrophobic group is particularly preferred. The discotic compound can uniformly be aligned by introducing the hydrophobic group into polyvinyl alcohol because the hydrophobic group has an affinity with the discotic compound. The hydrophobic group is attached to the side chain or the end of the main chain of polyvinyl alcohol.

The hydrophobic group preferably is an aliphatic group (more preferably an alkyl group or an alkenyl group) having 6 or more carbon atoms or an aromatic group.

In the case that the hydrophobic group is attached to the end of the main chain, a linking group is preferably introduced between the hydrophobic group and the end of the main chain. Examples of the linking group include —S—, —C(CN)R$^1$—, —NR$^2$—, —CS— and combinations thereof. Each of R$^1$ and R$^2$ is hydrogen or an alkyl group having 1 to 6 carbon atoms, and preferably is an alkyl group having 1 to 6 carbon atoms.

In the case that the hydrophobic group is attached to the side chain, the acetyl group of the vinyl acetate units in polyvinyl alcohol is partially replaced with an acyl group (—CO—R$^3$) having 7 or more carbon atoms. R$^3$ is an aliphatic group having 6 or more carbon atoms or an aromatic group.

Commercially available denatured polyvinyl alcohols (e.g., MP103, MP203, R1130, Kuraray Co., Ltd.) can be used in the orientation layer.

The (denatured) polyvinyl alcohol has a saponification degree preferably of not smaller than 80%. The (denatured) polyvinyl alcohol has a polymerization degree preferably of not smaller than 200.

The rubbing treatment can be conducted by rubbing the layer with a paper or cloth several times along a certain direction. A cloth is preferred to a paper. The cloth preferably uniformly contains uniform (about length and thickness) fibers.

[Transparent substrate]

A transparent substrate preferably is a polymer film made of a transparent polymer of positive inherent birefringence. The transparent substrate means that light transmittance is not less than 80%.

A polymer film made of a polymer of positive inherent birefringence usually has a (negative) refractive index ellipsoid having a shape like a pressed beach ball. The film has one or two optic axes along a normal line of the film. In the present invention, the above-mentioned polymer film is preferably used as the substrate in combination with an optical anisotropic layer containing a discotic compound, which has a negative inherent birefringence and an optical axis along a normal line of a discotic plane.

Examples of the polymers include polycarbonate, polyarylate, polysulfone, polyethersulfone, diacetyl cellulose and triacetyl cellulose. Polycarbonate and diacetyl cellulose and triacetyl cellulose are preferred. The polymer film is formed preferably according to a solvent casting method.

The transparent substrate preferably has an absolute retardation value in plane (Re$^2$) analogous to an absolute retardation value in plane of an optical anisotropic layer (Re$^1$). The retardation of the transparent substrate can be adjusted by a stretching (preferably biaxially stretching) treatment or by adjusting the shrinkage ratio along a longtitudinal or horizontal direction. The retardation can easily be adjusted by subjecting a polycarbonate film to an unbalanced biaxially stretching process.

The transparent substrate can be subjected to a surface treatment (e.g., glow discharge treatment, corona discharge treatment, ultraviolet (UV) treatment, flame treatment) to improve adhesion to a layer formed on the substrate (e.g., adhesive layer, orientation layer, optically anisotropic layer). A glow discharge treatment or a corona discharge treatment is preferred. Two or more surface treatments can be used in combination.

The transparent substrate has a thickness preferably in the range of 20 to 500 μm, and more preferably in the range of 50 to 200 μm.

An adhesive layer (undercoating layer) can be provided on the transparent substrate. The adhesive layer is preferably formed by coating a hydrophilic polymer (e.g., gelatin) on the transparent substrate.

The undercoating layer has a thickness preferably in the range of 0.1 to 2 μm, and more preferably in the range of 0.2 to 1 μm.

[Liquid crystal cell]

The present invention uses a vertically aligned (VA) liquid crystal cell. In the liquid crystal cell of a vertical alignment mode, a liquid crystal molecule is essentially vertically aligned while not applying voltage to the cell, and is essentially horizontally aligned while applying voltage to the cell, The liquid crystal molecule used in the VA cell usually has a negative dielectric anisotropy.

The product (Δn×d) of a refractive anisotropy (Δn) of the liquid crystal molecule and a thickness (d) of the liquid crystal layer of the liquid crystal cell is preferably in the range of 100 to 1,000 nm, more preferably in the range of 150 to 400 nm, and most preferably in the range of 200 to 350 nm to satisfy the brightness and the viewing angle.

The liquid crystal cell of a vertical alignment mode is used according to a normally white (NW) mode or a normally black (NB) mode. The present invention is particularly effective in the normally black mode.

[Liquid crystal display]

A liquid crystal display comprises a liquid crystal cell, a pair of optically compensatory sheets arranged on both sides of the cell (the first embodiment of the present invention) or an optically compensatory sheets arranged on one side of the cell, and a pair of polarizing elements arranged on the liquid crystal cell or the optical compensatory sheet.

The liquid crystal display include a direct looking type, a projection type and a modulation type. The present invention is also effective in a liquid crystal display having an active matrix such as TFT, MIM having three or two terminals.

The degree of wavelength dispersion of the liquid crystal cell is preferably analogous to the degree of wavelength dispersion of the optical compensatory sheet. In more detail, each of the liquid crystal cell and the optical compensatory sheet has a degree of a wavelength dispersion satisfying the following formula:

$$0.8 \leq \alpha2/\alpha1 \leq 1.3$$

in which α1 is a degree of a wavelength dispersion of the liquid crystal cell, which is a ratio (Re450/Re550) of a retardation value of the cell at the wavelength of 450 nm (Re450) to a retardation value of the cell at the wavelength of 550 nm (Re550), and α2 is a degree of a wavelength dispersion of the optical compensatory sheet, which is a ratio (Re450/Re550) of a retardation value of the sheet at the wavelength of 450 nm (Re450) to a retardation value of the sheet at the wavelength of 550 nm (Re550).

EXAMPLE 1

(Formation of transparent substrate)

In dichloromethane, 2,2'-bis(4-hydroxyphenyl)propane polycarbonate resin (viscosity average molecular weight: 28,000) was dissolved to obtain a 18 wt. % solution. The obtained solution was cast on a band, dried at 50° C. for 10 minutes, peeled from the band, and dried at 100° C. for 10 minutes. The obtained film was stretched by 7% along a longitudinal direction at 170° C., and was stretched by 5% along a horizontal direction at 175° C. to obtain a biaxially stretched roll film (transparent substrate) having the thickness of 100 μm. The longitudinal stretching was controlled by the difference between the rotating speeds of two chucking rolls. The horizontal stretching was controlled by the width of a tenter.

The retardation of the transparent substrate was measured by using an ellipsometer (AEP-100). The retardation in plane was −12 nm ($Re^2$=12) and the Rth retardation was 120 nm ($Rth^2$=120). The directions of nx and ny were present in the plane and the direction of nx was parallel to the normal line of the transparent substrate. The angle between the direction of the minimum retardation and the normal line of the substrate ($\beta^2$) was 0°.

(Surface treatment of transparent substrate)

The both surfaces of the transparent substrate (width: 30 cm) were subjected to a corona discharge treatment at room temperature by using a solid state corona discharger (6 KVA, Pillar). The treatment speed was 20 m per minute, and the treatment condition was 0.375 kV·A·minute per m². The treatment cycle was 9.6 kHz, and the gap clearance between an electrode and a dielectric roll was 1.6 mm.

(Formation of adhesive layer)

A coating solution of the following composition was coated on the surface treated transparent substrate by using a wire bar. The coating amount was 10 ml per m². The coated layer was dried at 115° C. for 2 minutes to form an adhesive layer.

| Coating solution for adhesive layer | |
| --- | --- |
| Gelatin | 1 weight part |
| Water | 1 weight part |
| Acetic acid | 1 weight part |
| Methanol | 50 weight parts |
| Ethylene dichloride | 50 weight parts |
| p-Chlorophenol | 4 weight parts |

(Formation of orientation layer)

A coating solution of the following composition was coated on the adhesive layer by using a slide coater. The coating amount was 10 ml per m². The coated layer was air dried at 60° C. for 60 seconds, and further air dried at 90° C. for 150 seconds to form an orientation layer.

| Coating solution for orientation layer | |
| --- | --- |
| The following denatured polyvinyl alcohol | 10 weight parts |
| Water | 371 weight parts |
| Methanol | 119 weight parts |
| Glutaric aldehyde (cross-linking agent) | 0.5 weight part |

(Denatured polyvinyl alcohol)

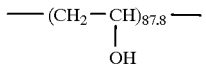

-continued

Coating solution for orientation layer

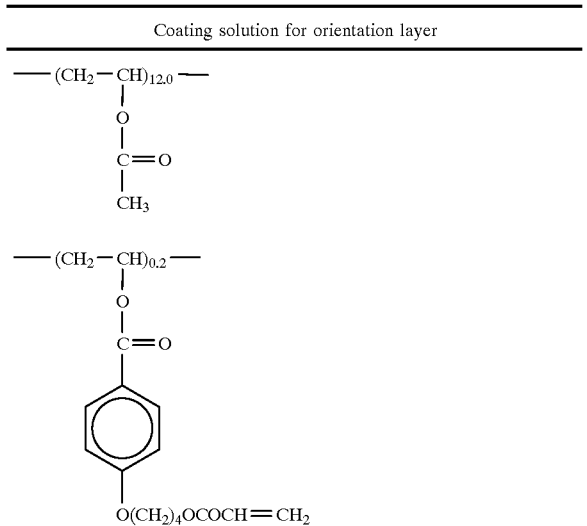

The formed layer was subjected to a rubbing treatment. The rubbing direction was parallel to the slow axis of the transparent substrate.

(Formation of optically anisotropic layer)

In 8.43 g of methyl ethyl ketone, 1.8 g of the following discotic (liquid crystal) compound, 0.2 g of trimethylolpropane triacrylate denatured with ethylene oxide (V#360, Osaka Organic Chemical Co., Ltd.), 0.04 g of cellulose acetate butyrate (CAB551-0.2, Eastman Chemical), 0.06 g of a photopolymerization initiator (Irgacure 907, Ciba-Geigy) and 0.02 g of a sensitizer (Kayacure DETX, Nippon Kayaku Co., Ltd.) were dissolved to prepare a coating solution. The coating solution was coated on the orientation layer by using a wire bar of #2.5. The sheet was adhered to a metal frame, and heated in a thermostat at 130° C. for 2 minutes to align the discotic compound. The sheet was irradiated with an ultraviolet ray at 130° C. for 1 minutes by using a high pressure mercury lamp of 120 W/cm. The sheet was cooled to room temperature to obtain an optical compensatory sheet (1).

(Discotic compound)

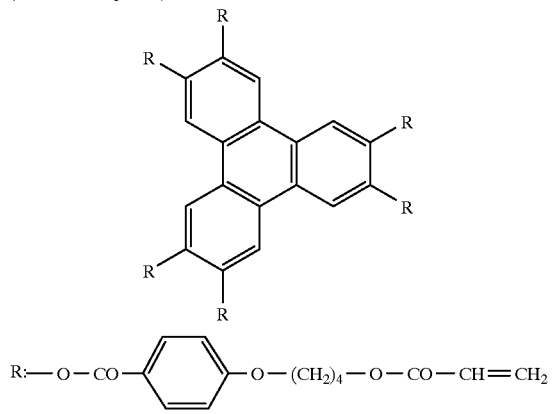

(Evaluation of optical compensatory sheet)

The thickness of the optically anisotropic layer was about 1.0 µm. The retardation value of the optically anisotropic layer was measured along the rubbing direction. As a result, a direction having retardation of 0 was not found in the optically anisotropic layer.

The average inclined angle of the optic axis of the optically anisotropic layer, namely the angle between the direction of the minimum retardation and the normal line of the sheet was 28° ($\beta^1$=28°). The retardation in plane was 15 nm ($Re^1$=15), and the Rth retardation was 35 nm ($Rth^1$=35).

The optical compensatory sheet (1) was vertically sliced along the rubbing direction to obtain a ultra-thin section (sample). The sample was placed an atmosphere of $OsO_4$ for 48 hours to dye the sample. The dyed sample was observed with a transparent electron microscope (TEM) to obtain a microscopic photograph. In the sample, the acryloyl group of the discotic compound was dyed to show an image in the photograph.

Upon checking the photograph, the discotic units in the optically anisotropic layer was inclined from the surface plane of the transparent substrate. The inclined angle continuously increased as the distance from the surface of the substrate increased.

The retardation of the optical compensatory sheet (1) was measured in the same manner as in the measurement of the optical anisotropic layer. The angle between the direction of the minimum retardation and the normal line of the sheet was 8° ($\beta^3$=8°), the retardation in plane was 3 nm ($Re^3$=3), and the Rth retardation was 150 rim ($Rth^3$=150).

EXAMPLE 2

On a glass place, an orientation layer was formed in the same manner as in Example 1. The formed layer was subjected to the rubbing treatment in the same manner as in Example 1. An optically anisotropic layer was formed on the orientation layer in the same manner as in Example 1.

The optically anisotropic layer was transferred to the transparent substrate used in Example 1 by using an adhesive to obtain an optical compensatory sheet (2). The rubbing direction was parallel to the slow axis of the transparent substrate.

The transparent substrate and the optically anisotropic layer were the same as those of the optical compensatory sheet (1) in Example 1. Accordingly, the optical characteristics of the transparent substrate and the optically anisotropic layer were the same as those measured in Example 1.

The optical characteristics of the optical compensatory sheet (2) were measured in the same manner as in Example 1. However, the results were the same as those of Example 1.

EXAMPLE 3

In dichloromethane, 2,2'-bis(4-hydroxyphenyl)propane polycarbonate resin (viscosity average molecular weight: 28,000) was dissolved to obtain a 18 wt. % solution. The obtained solution was cast on a band, dried at 50° C. for 10 minutes, peeled from the band, and dried at 100° C. for 10 minutes. The obtained film was stretched by 7% along a longitudinal direction at 170° C., and was stretched by 5% along a horizontal direction at 175° C. to obtain a biaxially stretched roll film (transparent substrate) having the thickness of 100 µm. The longitudinal stretching was controlled by the difference between the rotating speeds of two chucking rolls. The horizontal stretching was controlled by the width of a tenter.

The retardation of the transparent substrate was measured by using an ellipsometer (AEP-100). The retardation in plane was −7 nm ($Re^2=7$) and the Rth retardation was 120 nm ($Rth^2=120$). The directions of nx and ny were present in the plane and the direction of nx was parallel to the normal line of the transparent substrate. The angle between the direction of the minimum retardation and the normal line of the substrate ($\beta^2$) was 0°.

An optical compensatory sheet (3) was prepared in the same manner as in Example 1, except that the above-prepared transparent substrate was used and the rubbing direction of the orientation layer was perpendicular to the slow axis of the transparent substrate. The optical characteristics of the optical compensatory sheet (3) were measured in the same manner as in Example 1. The results are set forth in Table 1.

COMPARISON EXAMPLE 1

In dichloromethane, 2,2'-bis(4-hydroxyphenyl)propane polycarbonate resin (viscosity average molecular weight: 28,000) was dissolved to obtain a 18 wt. % solution. The obtained solution was cast on a band, dried at 50° C. for 10 minutes, peeled from the band, and dried at 100° C. for 10 minutes. The obtained film was stretched by 12% along a longitudinal direction at 170° C., and was stretched by 14% along a horizontal direction at 175° C. to obtain a biaxially stretched roll film having the thickness of 100 μm. The longitudinal stretching was controlled by the difference between the rotating speeds of two chucking rolls. The horizontal stretching was controlled by the width of a tenter.

The retardation of the film was measured by using an ellipsometer (AEP-100). The retardation in plane was 5 nm ($Re^2=5$) and the Rth retardation was 270 nm ($Rth^2=270$). The directions of nx and ny were present in the plane and the direction of nx was parallel to the normal line of the transparent substrate. The angle between the direction of the minimum retardation and the normal line of the substrate ($\beta^2$) was 0°.

The obtained film itself was used as an optical compensatory sheet (x).

EXAMPLE 4

In dichloromethane, 2,2'-bis(4-hydroxyphenyl)propane polycarbonate resin (viscosity average molecular weight: 28,000) was dissolved to obtain a 18 wt. % solution. The obtained solution was cast on a band, dried at 50° C. for 10 minutes, peeled from the band, and dried at 100° C. for 10 minutes. The obtained film was stretched by 13% along a longitudinal direction at 170° C., and was stretched by 9% along a horizontal direction at 175° C. to obtain a biaxially stretched roll film (transparent substrate) having the thickness of 100 μm. The longitudinal stretching was controlled by the difference between the rotating speeds of two chucking rolls. The horizontal stretching was controlled by the width of a tenter.

The retardation of the transparent substrate was measured by using an ellipsometer (AEP-100). The retardation in plane was −24 nm ($Re^2=24$) and the Rth retardation was 120 nm ($Rth^2=120$). The directions of nx and ny were present in the plane and the direction of nx was parallel to the normal line of the transparent substrate. The angle between the direction of the minimum retardation and the normal line of the substrate ($\beta^2$) was 0°.

The transparent substrate was surface treated in the same manner as in Example 1. Further, an adhesive layer and an orientation layer was formed on the transparent substrate in the same manner as in Example 1.

In 6.996 g of methyl ethyl ketone, 3.06 g of the discotic (liquid crystal) compound used in Example 1, 0.34 g of trimethylolpropane triacrylate denatured with ethylene oxide (V#360, Osaka Organic Chemical Co., Ltd.), 0.068 g of cellulose acetate butyrate (CAB551-0.2, Eastman Chemical), 0.102 g of a photopolymerization initiator (Irgacure 907, Ciba-Geigy) and 0.034 g of a sensitizer (Kayacure DETX, Nippon Kayaku Co., Ltd.) were dissolved to prepare a coating solution. The coating solution was coated on the orientation layer by using a wire bar of #3.0. The sheet was adhered to a metal frame, and heated in a thermostat at 130° C. for 2 minutes to align the discotic compound. The sheet was irradiated with an ultraviolet ray at 130° C. for 1 minutes by using a high pressure mercury lamp of 120 W/cm. The sheet was cooled to room temperature to obtain an optical compensatory sheet (4).

The retardation of the optically anisotropic layer was measured in the same manner as in Example 1. The angle between the direction of the minimum retardation and the normal line of the sheet was 35° ($\beta^1=35°$). The retardation in plane was 30 nm ($Re^1=30$), and the Rth retardation was 70 nm ($Rth^1=70$).

Further, the optical characteristics of the optical compensatory sheet (4) were measured in the same manner as in Example 1. The results are set forth in Table 1.

EXAMPLE 5

On a glass place, an orientation layer was formed in the same manner as in Example 1. The formed layer was subjected to the rubbing treatment in the same manner as in Example 1. An optically anisotropic layer was formed on the orientation layer in the same manner as in Example 4.

The optically anisotropic layer was transferred to the transparent substrate used in Example 4 by using an adhesive to obtain an optical compensatory sheet (5). The rubbing direction was parallel to the slow axis of the transparent substrate.

The transparent substrate and the optically anisotropic layer were the same as those of the optical compensatory sheet (4) in Example 4. Accordingly, the optical characteristics of the transparent substrate and the optically anisotropic layer were the same as those measured in Example 4.

The optical characteristics of the optical compensatory sheet (5) were measured in the same manner as in Example 1. However, the results were the same as those of Example 4.

EXAMPLE 6

Three sheets of triacetyl cellulose film (Fujitac, Fuji Photo Film Co., Ltd.) were laminated with an adhesive. The machine directions of the sheets were in parallel with each other. The lamination was used as a transparent substrate.

The retardation of the transparent substrate was measured by using an ellipsometer (AEP-100). The retardation in plane was −13 nm ($Re^2$=13) and the Rth retardation was 120 nm ($Rth^2$=120). The directions of nx and ny were present in the plane and the direction of nx was parallel to the normal line of the transparent substrate. The angle between the direction of the minimum retardation and the normal line of the substrate ($\beta^2$) was 0°.

An optical compensatory sheet (6) was prepared in the same manner as in Example 4, except that the above-prepared transparent substrate was used. The optical characteristics of the optical compensatory sheet (6) were measured in the same manner as in Example 1. The results are set forth in Table 1.

TABLE 1

| Sample | Anisotropic layer | | | Substrate | | | OC sheet | | |
|---|---|---|---|---|---|---|---|---|---|
| | Form | $\beta^1$ | $Re^1$ | $Rth^1$ | $\beta^2$ | $Re^2$ | $Rth^2$ | $\beta^3$ | $Re^3$ | $Rth^3$ |
| (1) | C | 28° | 15 | 35 | 0° | 12 | 120 | 8° | 3 | 150 |
| (2) | T | 28° | 15 | 35 | 0° | 12 | 120 | 8° | 3 | 150 |
| (3) | C | 28° | 15 | 35 | 0° | 7 | 120 | 8° | 8 | 150 |
| (x) | None | | | | 0° | 5 | 280 | 0° | 5 | 280 |
| (4) | C | 35° | 30 | 70 | 0° | 24 | 240 | 8° | 6 | 300 |
| (5) | T | 35° | 30 | 70 | 0° | 24 | 240 | 8° | 6 | 300 |
| (6) | C | 35° | 15 | 35 | 0° | 13 | 120 | 8° | 2 | 300 |

(Remark)
Form: An optically anisotropic layer formed by coating (C) or transferring (T) method
OC sheet: Optical compensatory sheet

EXAMPLE 11
(Preparation of liquid crystal cell)

To a 3 wt. % aqueous solution of polyvinyl alcohol, 1 wt. % of octadecyldimethylammonium chloride (coupling agent) was added. The mixture was coated on a glass plate having an ITO electrode by using a spin coater. After heating the coating layer at 160° C., the layer was subjected to a rubbing treatment to form an orientation layer for vertical alignment. The orientation layers were formed on two glass plates. The rubbing direction on one glass plate was reverse to the rubbing direction on the other plate. The two glass plates were placed by facing the orientation layer with each other. The cell gap (d) was 5.5 μm. A liquid crystal molecule (Δn: 0.05) comprising an ester liquid crystal molecule and an ethane liquid crystal molecule was injected into the cell gap to prepare a liquid crystal cell of a vertical alignment mode. The product of Δn and d was 275 nm.

(Preparation of liquid crystal display)

Two optical compensatory sheets (1) was arranged on both sides of the liquid crystal cell of a vertical alignment mode. The optically anisotropic layer of the optical compensatory sheet was faced with the glass plate of the liquid crystal cell. The rubbing direction of the orientation layer of the liquid crystal cell was reversely parallel to the rubbing direction of the orientation layer of the optical compensatory sheet. Two polarizing elements were arranged on the optical compensatory sheet according to a crossed nicols arrangement.

Voltage of a square wave was applied to the liquid crystal cell of the vertical alignment mode. An image was displayed according to an NB mode (black: 2 V, white: 6 V). A ratio of the transmittance (white/black) was measured as a contrast ratio. The upward, downward, leftward and rightward contrast ratios were measured by using a meter (EZ-Contrast 160D, ELDIM). The results are set forth in Table 2.

EXAMPLE 12

Two optical compensatory sheets (1) was arranged on both sides of the liquid crystal cell of a vertical alignment mode used in Example 11. The transparent substrate of the optical compensatory sheet was faced with the glass plate of the liquid crystal cell. The rubbing direction of the orientation layer of the liquid crystal cell was parallel to the rubbing direction of the orientation layer of the optical compensatory sheet. Two polarizing elements were arranged on the optical compensatory sheet according to a crossed nicols arrangement.

Voltage of a square wave was applied to the liquid crystal cell of the vertical alignment mode. An image was displayed according to an NB mode (black: 2 V, white: 6 V). A ratio of the transmittance (white/black) was measured as a contrast ratio. The upward, downward, leftward and rightward contrast ratios were measured by using a meter (EZ-Contrast 160D, ELDIM). The results are set forth in Table 2.

EXAMPLE 13

Two optical compensatory sheets (2) was arranged on both sides of the liquid crystal cell of a vertical alignment mode used in Example 11. The optically anisotropic layer of the optical compensatory sheet was faced with the glass plate of the liquid crystal cell. The rubbing direction of the orientation layer of the liquid crystal cell was parallel to the rubbing direction of the orientation layer of the optical compensatory sheet. Two polarizing elements were arranged on the optical compensatory sheet according to a crossed nicols arrangement.

Voltage of a square wave was applied to the liquid crystal cell of the vertical alignment mode. An image was displayed according to an NB mode (black: 2 V, white: 6 V). A ratio of the transmittance (white/black) was measured as a contrast ratio. The upward, downward, leftward and rightward contrast ratios were measured by using a meter (EZ-Contrast 160D, ELDIM). The results are set forth in Table 2.

EXAMPLE 14

Two optical compensatory sheets (2) was arranged on both sides of the liquid crystal cell of a vertical alignment mode used in Example 11. The transparent substrate of the optical compensatory sheet was faced with the glass plate of the liquid crystal cell. The rubbing direction of the orientation layer of the liquid crystal cell was reversely parallel to the rubbing direction of the orientation layer of the optical compensatory sheet. Two polarizing elements were arranged on the optical compensatory sheet according to a crossed nicols arrangement.

Voltage of a square wave was applied to the liquid crystal cell of the vertical alignment mode. An image was displayed according to an NB mode (black: 2 V, white: 6 V). A ratio of the transmittance (white/black) was measured as a contrast ratio. The upward, downward, leftward and rightward contrast ratios were measured by using a meter (EZ-Contrast 160D, ELDIM). The results are set forth in Table 2.

EXAMPLE 15

One optical compensatory sheet (3) was arranged on a display (observing) side of the liquid crystal cell of a vertical alignment mode used in Example 11. The optically anisotropic layer of the optical compensatory sheet was faced with the glass plate of the liquid crystal cell. The rubbing direction of the orientation layer of the liquid crystal cell was reversely parallel to the rubbing direction of the orientation layer of the optical compensatory sheet. Two polarizing elements were arranged on the liquid crystal cell and the optical compensatory sheet according to a crossed nicols arrangement.

Voltage of a square wave was applied to the liquid crystal cell of the vertical alignment mode. An image was displayed according to an NB mode (black: 2 V, white: 6 V). A ratio of the transmittance (white/black) was measured as a contrast ratio. The upward, downward, leftward and rightward contrast ratios were measured by using a meter (EZ-Contrast 160D, ELDIM). The results are set forth in Table 2.

COMPARISON EXAMPLE 2

One optical compensatory sheet (x) was arranged on a display (observing) side of the liquid crystal cell of a vertical alignment mode used in Example 11. The rubbing direction of the orientation layer of the liquid crystal cell was perpendicular to the slow axis of the optical compensatory sheet. Two polarizing elements were arranged on the liquid crystal cell and the optical compensatory sheet according to a crossed nicols arrangement.

Voltage of a square wave was applied to the liquid crystal cell of the vertical alignment mode. An image was displayed according to an NB mode (black: 2 V, white: 6 V). A ratio of the transmittance (white/black) was measured as a contrast ratio. The upward, downward, leftward and rightward contrast ratios were measured by using a meter (EZ-Contrast 160D, ELDIM). The results are set forth in Table 2.

EXAMPLE 16

One optical compensatory sheet (4) was arranged on a display (observing) side of the liquid crystal cell of a vertical alignment mode used in Example 11. The optically anisotropic layer of the optical compensatory sheet was faced with the glass plate of the liquid crystal cell. The rubbing direction of the orientation layer of the liquid crystal cell was reversely parallel to the rubbing direction of the orientation layer of the optical compensatory sheet. Two polarizing elements were arranged on the liquid crystal cell and the optical compensatory sheet according to a crossed nicols arrangement.

Voltage of a square wave was applied to the liquid crystal cell of the vertical alignment mode. An image was displayed according to an NB mode (black: 2 V, white: 6 V). A ratio of the transmittance (white/black) was measured as a contrast ratio. The upward, downward, leftward and rightward contrast ratios were measured by using a meter (EZ-Contrast 160D, ELDIM). The results are set forth in Table 2.

EXAMPLE 17

One optical compensatory sheet (4) was arranged on a display (observing) side of the liquid crystal cell of a vertical alignment mode used in Example 11. The transparent substrate of the optical compensatory sheet was faced with the glass plate of the liquid crystal cell. The rubbing direction of the orientation layer of the liquid crystal cell was parallel to the rubbing direction of the orientation layer of the optical compensatory sheet. Two polarizing elements were arranged on the liquid crystal cell and the optical compensatory sheet according to a crossed nicols arrangement.

Voltage of a square wave was applied to the liquid crystal cell of the vertical alignment mode. An image was displayed according to an NB mode (black: 2 V, white: 6 V). A ratio of the transmittance (white/black) was measured as a contrast ratio. The upward, downward, leftward and rightward contrast ratios were measured by using a meter (EZ-Contrast 160D, ELDIM). The results are set forth in Table 2.

EXAMPLE 18

One optical compensatory sheet (5) was arranged on a display (observing) side of the liquid crystal cell of a vertical alignment mode used in Example 11. The optically anisotropic layer of the optical compensatory sheet was faced with the glass plate of the liquid crystal cell. The rubbing direction of the orientation layer of the liquid crystal cell was parallel to the rubbing direction of the orientation layer of the optical compensatory sheet. Two polarizing elements were arranged on the liquid crystal cell and the optical compensatory sheet according to a crossed nicols arrangement.

Voltage of a square wave was applied to the liquid crystal cell of the vertical alignment mode. An image was displayed according to an NB mode (black: 2 V, white: 6 V). A ratio of the transmittance (white/black) was measured as a contrast ratio. The upward, downward, leftward and rightward contrast ratios were measured by using a meter (EZ-Contrast 160D, ELDIM). The results are set forth in Table 2.

EXAMPLE 19

One optical compensatory sheet (5) was arranged on a display (observing) side of the liquid crystal cell of a vertical alignment mode used in Example 11. The transparent substrate of the optical compensatory sheet was faced with the glass plate of the liquid crystal cell. The rubbing direction of the orientation layer of the liquid crystal cell was reversely parallel to the rubbing direction of the orientation layer of the optical compensatory sheet. Two polarizing elements were arranged on the liquid crystal cell and the optical compensatory sheet according to a crossed nicols arrangement.

Voltage of a square wave was applied to the liquid crystal cell of the vertical alignment mode. An image was displayed according to an NB mode (black: 2 V, white: 6 V). A ratio of the transmittance (white/black) was measured as a contrast ratio. The upward, downward, leftward and rightward contrast ratios were measured by using a meter (EZ-Contrast 160D, ELDIM). The results are set forth in Table 2.

EXAMPLE 20

One optical compensatory sheet (6) was arranged on a display (observing) side of the liquid crystal cell of a vertical alignment mode used in Example 11. The optically anisotropic layer of the optical compensatory sheet was faced with the glass plate of the liquid crystal cell. The rubbing direction of the orientation layer of the liquid crystal cell was reversely parallel to the rubbing direction of the orientation layer of the optical compensatory sheet. Two polarizing elements were arranged on the liquid crystal cell and the optical compensatory sheet according to a crossed nicols arrangement.

Voltage of a square wave was applied to the liquid crystal cell of the vertical alignment mode. An image was displayed according to an NB mode (black: 2 V, white: 6 V). A ratio of the transmittance (white/black) was measured as a contrast ratio. The upward, downward, leftward and rightward contrast ratios were measured by using a meter (EZ-Contrast 160D, ELDIM). The results are set forth in Table 2.

COMPARISON EXAMPLE 3

Two polarizing elements were arranged on the liquid crystal cell and the optical compensatory sheet according to a crossed nicols arrangement without using an optical compensatory sheet.

Voltage of a square wave was applied to the liquid crystal cell of the vertical alignment mode. An image was displayed according to an NB mode (black: 2 V, white: 6 V). A ratio of the transmittance (white/black) was measured as a contrast ratio. The upward, downward, leftward and rightward contrast ratios were measured by using a meter (EZ-Contrast 160D, ELDIM). The results are set forth in Table 2.

TABLE 2

| Sample | OC sheet (A) | (B) | (C) | $Re^3$ | $\alpha2/\alpha1$ | Ratio | Viewing angle U | D | L | R |
|---|---|---|---|---|---|---|---|---|---|---|
| 11 | (1) | 2 | N-R | 3 | 1.13 | 300 | 70 | 70 | 70 | 70 |
| 12 | (1) | 2 | R-N | 3 | 1.13 | 300 | 70 | 70 | 70 | 70 |
| 13 | (2) | 2 | N-N | 3 | 1.13 | 300 | 70 | 70 | 70 | 70 |
| 14 | (2) | 2 | R-R | 3 | 1.13 | 300 | 70 | 70 | 70 | 70 |
| 15 | (3) | 1 | N-R | 8 | 1.13 | 100 | 60 | 60 | 60 | 60 |
| C1 | (x) | 1 | — | 5 | 1.01 | 300 | 40 | 60 | 60 | 60 |
| 16 | (4) | 1 | N-R | 6 | 1.13 | 300 | 70 | 70 | 70 | 70 |
| 17 | (4) | 1 | R-N | 6 | 1.13 | 300 | 70 | 70 | 70 | 70 |
| 18 | (5) | 1 | N-N | 6 | 1.13 | 300 | 70 | 70 | 70 | 70 |
| 19 | (5) | 1 | R-R | 6 | 1.13 | 300 | 70 | 70 | 70 | 70 |
| 20 | (6) | 1 | N-R | 2 | 0.72 | 120 | 60 | 60 | 60 | 60 |
| C3 | No OC sheet | | | | | 300 | 30 | 40 | 40 | 40 |

(Remark)
(A): Optical compensatory sheet prepared in Examples 1 to 6 and Comparison Example 1 (x)
(B): Number of optical compensatory sheet(s) used in a liquid crystal display
(C): Arrangement of an optical compensatory sheet, which indicates whether an optically anisotropic layer (N) or a transparent substrate (R) is faced with a glass plate, and (–) whether the rubbing direction of the liquid crystal cell is parallel (N) or reversely parallel (R) to the rubbing direction of the optical compensatory sheet
Ratio: Contrast ratio (white/black).
Viewing angle: An angle that can view an image having a contrast ratio of not smaller than 10 along upward (U), downward (D), leftward (L) or rightward (R) direction

We claim:

1. A liquid crystal display comprising a liquid crystal cell of a vertical alignment mode, two optical compensatory sheets arranged on both sides of the liquid crystal cell and two polarizing elements arranged on the optical compensatory sheets, said liquid crystal cell containing liquid crystal molecules, which are essentially vertically aligned while not applying voltage to the cell, and are essentially horizontally aligned while applying voltage to the cell, wherein each of the optical compensatory sheets comprises a transparent substrate and an optically anisotropic layer containing a discotic compound, said optically anisotropic layer having an optical anisotropy to optically compensate an optical anisotropy of the liquid crystal cell while applying voltage to the cell, and each of said optical compensatory sheets having a retardation value in plane in the range of –5 to 5 nm.

2. The liquid crystal display as defined in claim 1, wherein the optically anisotropic layer and the transparent substrate are so arranged that a slow axis of the optically anisotropic layer is essentially perpendicular to a slow axis of the transparent substrate, and each of the optically anisotropic layer and the transparent substrate has retardation in plane satisfying the following formula:

$$|Re^1 - Re^2| \leq 5 \text{ nm}$$

in which $Re^1$ is an absolute retardation value in plane of the optically anisotropic layer and $Re^2$ is an absolute retardation value in plane of the transparent substrate.

3. The liquid crystal display as defined in claim 1, wherein each of the liquid crystal cell and the optical compensatory sheet has a degree of a wavelength dispersion satisfying the following formula:

$$0.8 \leq \alpha2/\alpha1 \leq 1.3$$

in which $\alpha1$ is a degree of a wavelength dispersion of the liquid crystal cell, which is a ratio of a retardation value of the cell at the wavelength of 450 nm to a retardation value of the cell at the wavelength of 550 nm, and $\alpha2$ is a degree of a wavelength dispersion of the optical compensatory sheet, which is a ratio of a retardation value of the sheet at the wavelength of 450 nm to a retardation value of the sheet at the wavelength of 550 nm.

4. The liquid crystal display as defined in claim 1, wherein the liquid crystal molecule has a negative dielectric anisotropy.

5. The liquid crystal display as defined in claim 1, wherein the transparent substrate is a biaxially stretched polymer film.

6. The liquid crystal display as defined in claim 1, wherein the discotic compound is aligned and fixed in the optically anisotropic layer.

7. A liquid crystal display comprising a liquid crystal cell of a vertical alignment mode, an optical compensatory sheets arranged on one side of the liquid crystal cell and two polarizing elements arranged on the liquid crystal cell and the optical compensatory sheet, said liquid crystal cell containing liquid crystal molecules, which are essentially vertically aligned while not applying voltage to the cell, and are essentially horizontally aligned while applying voltage to the cell,
wherein the optical compensatory sheet comprises a transparent substrate and an optically anisotropic layer containing a discotic compound, said optically anisotropic layer having an optical anisotropy to optically compensate an optical anisotropy of the liquid crystal cell while applying voltage to the cell, and said optical compensatory sheet having a retardation value in plane in the range of –10 to 10 nm.

8. The liquid crystal display as defined in claim 7, wherein the optically anisotropic layer and the transparent substrate are so arranged that a slow axis of the optically anisotropic layer is essentially perpendicular to a slow axis of the transparent substrate, and each of the optically anisotropic layer and the transparent substrate has retardation in plane satisfying the following formula:

$$|Re^1 - Re^2| \leq 10 \text{ nm}$$

in which $Re^1$ is an absolute retardation value of the optically anisotropic layer in plane and $Re^2$ is an absolute retardation value of the transparent substrate in plane.

9. The liquid crystal display as defined in claim 7, wherein each of the liquid crystal cell and the optical compensatory sheet has a degree of a wavelength dispersion satisfying the following formula:

$$0.8 \leq \alpha 2/\alpha 1 \leq 1.3$$

in which $\alpha 1$ is a degree of a wavelength dispersion of the liquid crystal cell, which is a ratio of a retardation value of the cell at the wavelength of 450 nm to a retardation value of the cell at the wavelength of 550 nm, and $\alpha 2$ is a degree of a wavelength dispersion of the optical compensatory sheet, which is a ratio of a retardation value of the sheet at the wavelength of 450 nm to a retardation value of the sheet at the wavelength of 550 nm.

10. The liquid crystal display as defined in claim 7, wherein the liquid crystal molecule has a negative dielectric anisotropy.

11. The liquid crystal display as defined in claim 7, wherein the transparent substrate is a biaxially stretched polymer film.

12. The liquid crystal display as defined in claim 7, wherein the discotic compound is aligned and fixed in the optically anisotropic layer.

13. An optical compensatory sheet comprising a transparent substrate and an optically anisotropic layer containing a discotic compound, wherein the optically anisotropic layer and the transparent substrate are so arranged that a slow axis of the optically anisotropic layer is essentially perpendicular to a slow axis of the transparent substrate, and each of the optically anisotropic layer and the transparent substrate has retardation in plane satisfying the following formula:

$$|Re^1 - Re^2| \leq 10 \text{ nm}$$

in which $Re^1$ is an absolute retardation value in plane of the optically anisotropic layer and $Re^2$ is an absolute retardation value in plane of the transparent substrate.

14. The optical compensatory sheet as defined in claim 13, wherein the optical compensatory sheet has a retardation in plane in the range of −10 to 10 nm.

15. The optical compensatory sheet as defined in claim 13, wherein the minimum retardation value of the optically anisotropic layer is larger than 0.

16. The optical compensatory sheet as defined in claim 13, wherein the optical compensatory sheet has a direction of the minimum retardation, and an angle between the direction and a normal line of the sheet is in the range of 0 to 50°.

17. The optical compensatory sheet as defined in claim 13, wherein the optical compensatory sheet has a Rth retardation value defined by the following formula in the range of 10 to 600 nm:

$$Rth = |[\{(n1+n2)/2\} - n3] \times d|$$

in which each of n1, n2 and n3 is the principal refractive index in a refractive index ellipsoid approximately obtained from an optical anisotropy of the optical compensatory sheet, n3 is the minimum index, and d is the thickness of the optical compensatory sheet.

18. The optical compensatory sheet as defined in claim 13, wherein the transparent substrate is a biaxially stretched polymer film.

19. The optical compensatory sheet as defined in claim 13, wherein the discotic compound is aligned and fixed in the optically anisotropic layer.

* * * * *